United States Patent

McCarter et al.

[11] Patent Number: 5,567,498
[45] Date of Patent: Oct. 22, 1996

[54] TEXTURED BALLISTIC ARTICLE

[75] Inventors: Kevin S. McCarter; Steven A. Young; Pamela K. Laws, all of Richmond, Va.

[73] Assignee: AlliedSignal Inc., Morristown, N.J.

[21] Appl. No.: 126,838

[22] Filed: Sep. 24, 1993

[51] Int. Cl.$^6$ ............................................. B32B 5/12
[52] U.S. Cl. ...................... 428/113; 428/105; 428/104; 428/111; 428/114; 428/229; 428/246; 428/247; 428/253; 428/286; 428/298; 428/409; 428/902; 428/911; 2/2.5
[58] Field of Search .................................. 428/229, 245, 428/286, 902, 294, 105, 109, 111, 172, 246, 247, 253, 298, 911, 113, 409, 114; 2/2.5

[56] References Cited

U.S. PATENT DOCUMENTS

| | | | |
|---|---|---|---|
| 3,000,772 | 9/1961 | Lunn | 154/52.5 |
| 4,403,012 | 9/1983 | Harpell et al. | 428/290 |
| 4,457,985 | 7/1984 | Harpell et al. | 428/224 |
| 4,501,856 | 2/1985 | Harpell et al. | 525/240 |
| 4,543,286 | 9/1985 | Harpell et al. | 428/288 |
| 4,563,392 | 1/1986 | Harpell et al. | 428/394 |
| 4,584,347 | 4/1986 | Harpell et al. | 525/119 |
| 4,613,535 | 9/1986 | Harpell et al. | 428/113 |
| 4,623,574 | 11/1986 | Harpell et al. | 428/113 |
| 4,650,710 | 3/1987 | Harpell et al. | 428/263 |
| 4,681,792 | 7/1987 | Harpell et al. | 428/102 |
| 4,737,401 | 4/1988 | Harpell et al. | 428/252 |
| 4,737,402 | 4/1988 | Harpell et al. | 428/252 |
| 4,748,064 | 5/1988 | Harpell et al. | 428/113 |
| 4,820,568 | 4/1989 | Harpell et al. | 428/113 |
| 4,916,000 | 4/1990 | Li et al. | 428/105 |
| 5,061,520 | 10/1991 | Li et al. | 428/195 |
| 5,093,158 | 3/1992 | Li et al. | 427/278 |
| 5,124,195 | 6/1992 | Harpell et al. | 428/245 |

FOREIGN PATENT DOCUMENTS

| | | |
|---|---|---|
| WO89/01125 | 2/1989 | WIPO . |
| WO90/06389 | 6/1990 | WIPO . |
| WO91/04855 | 4/1991 | WIPO . |
| WO94/09336 | 4/1994 | WIPO . |

*Primary Examiner*—James J. Bell
*Attorney, Agent, or Firm*—Renee J. Rymarz; Melanie L. Brown

[57] ABSTRACT

An article that includes at least two networks of high strength fibers and a matrix material which impregnates the high strength fibers to form a composite element having a first plane profile and a second plane profile, wherein at least one of the first and second plane profiles has on its surface a textured pattern, and the matrix material is distributed substantially uniformly over the textured plane profile, and a method for making the composite element.

20 Claims, 1 Drawing Sheet

TEXTURED BALLISTIC ARTICLE

BACKGROUND OF THE INVENTION

The present invention relates to a flexible ballistic resistant article which includes a network of high strength fibers in an elastomeric matrix material.

Various constructions are known for ballistic resistant articles such as vests, curtains, mats, raincoats and umbrellas. These articles display varying degrees of resistance to penetration by high speed impact from projectiles such as BB's, bullets, shells, shrapnel, glass fragments and the like. U.S. Pat. Nos. 5,196,252; 5,187,023; 5,185,195; 5,175,000; 5,167,876; 5,124,195; 5,112,667; 5,061,545; 5,006,390; 4,953,234; 4,916,00; 4,883,700; 4,820,568; 4,748,064; 4,737,402; 4,737,401; 4,681,792; 4,650,710; 4,623,574; 4,613,535; 4,584,347; 4,563,392; 4,543,286; 4,501,856; 4,457,985; and 4,403,012 describe ballistic resistant articles which include high strength fibers made from materials such as extended chain ultra-high molecular weight polyethylene. Typically these fibers are coated, embedded or impregnated with a matrix material such as a polymeric composition or resin.

U.S. Pat. Nos. 5,061,545 and 5,093,158 describe a composite layer of a high strength fibrous network and a resin matrix wherein the fibrous network is nonuniformly impregnated with the resin matrix. The composite layer is formed by feeding the fluid resin matrix onto a fibrous network and passing the resin coated fibrous network through a gap between two compression rolls, at least one of which has a patterned surface. The patterned surface causes the still fluid resin matrix to flow into a non-uniform layer corresponding to the patterned surface. After passing through the rolls, the resin coated fibrous network layer is subjected to heat in order to remove the solvent from the resin matrix, thereby forming a consolidated composite layer which can be used as a prepreg to form a composite having more than one fibrous network. The resulting composite layer has a distribution of resin which is in a pattern wherein there are areas of the composite layer which are thick and have a greater resin to fiber ratio and areas of the composite layer which are thinner and have a lower resin to fiber ratio. The main objective of this composite layer is to increase the volume ratio of fiber to resin which in turn increases the ballistic resistance of a composite made from these layers.

U.S. Pat. No. 5,124,195 describes a fibrous web coated with a polymeric composition wherein the coated web is flexed sufficiently over at least a portion of the web surface to form a plurality of permanent creases distributed the web surface and to increase the flexibility of the web.

Although the ballistic resistant articles described in the above documents provide sufficient protection against most threats, a need exists for further improvement in flexibility without adverse consequences to ballistic performance.

SUMMARY OF THE INVENTION

It is therefore an object of the present invention to provide a composite with improved flexibility without sacrificing ballistic performance. In accomplishing the foregoing object there is provided according to the present invention a composite comprising at least one element which includes at least two adjacent fiber network layers, each of the fiber network layers comprising a network of high strength fibers in a matrix material, wherein the element has a first plane profile and a second plane profile, at least one of the first and second plane profiles has on its surface a textured pattern, and the matrix material is distributed substantially uniformly over the textured plane profile.

The textured element can be made by a method comprising:

(a) distributing a matrix material substantially uniformly over a fiber network;

(b) consolidating the matrix material and the fiber network to form a fiber network layer;

(c) adhering together at least two of the fiber network layers to form an element having a first plane profile and a second plane profile; and (c) texturing the surface of at least one of the first and second plane profiles.

There also is provided an article, such as an insert for a bullet resistant vest, which includes the previously described composite.

Further objects, features and advantages of the present invention will become apparent from the detailed description of preferred embodiments that follows.

BRIEF DESCRIPTION OF THE DRAWING

The invention will be described in more details below with reference to the drawing, wherein.

DETAILED DESCRIPTION OF THE INVENTION

Figure 1:
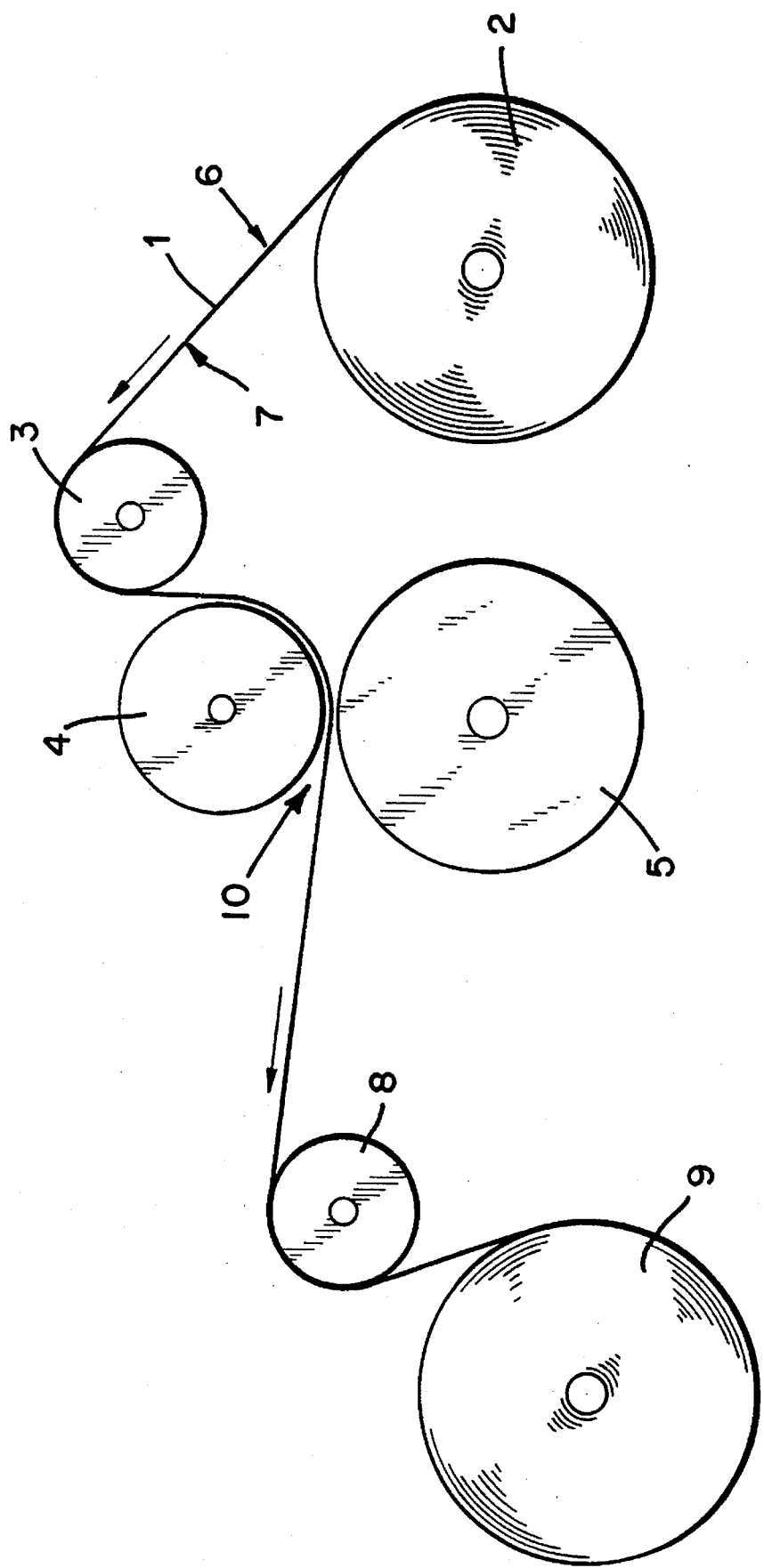
FIG. 1 is a schematic representation of a method for making the composite of the invention.

The present invention provides an improved, flexible article which is particularly useful as ballistic resistant "soft" armor. By "soft" armor is meant an article, such as a bulletproof vest, which is sufficiently flexible to wear as a protective garment.

As used herein, "fiber" denotes an elongate body, the length dimension of which is much greater than the transverse dimensions of width and thickness. Accordingly, "fiber" includes monofilament, multi-filament, ribbon, strip, staple and other forms of chopped, cut or discontinuous fiber and the like having regular or irregular cross-sections. "Fiber" includes a plurality of any one of the above or a combination of the above.

The cross-sections of filaments for use in this invention may vary widely. They may be circular, flat or oblong in cross-section. They also may be of irregular or regular multi-lobal cross-section having one or more regular or irregular lobes projecting from the linear or longitudinal axis of the filament. It is particularly preferred that the filaments be of substantially circular, flat or oblong cross-section, most preferably the former.

As used herein, "fiber network" denotes a plurality of fibers arranged into a predetermined configuration or a plurality of fibers grouped together to form a twisted or untwisted yarn, which yarns are arranged into a predetermined configuration. The fiber network can have various configurations. For example, the fibers or yarn may be formed as a felt or other nonwoven, knitted or woven into a network, or formed into a network by any conventional techniques. According to a particularly preferred network configuration, the fibers are unidirectionally aligned so that they are substantially parallel to each other along a common fiber direction.

High strength fibers for use in this invention are those having a tenacity equal to or greater than about 7 g/d, a tensile modulus equal to or greater than about 100 g/d and an energy-to-break equal to or greater than about 8 Joules/gram (J/g). Preferred fibers are those having a tenacity equal to or greater than about 10 g/d, a tensile modulus equal to or greater than about 200 g/d and an energy-to-break equal to or greater than about 20 J/g. More preferred fibers are those having a tenacity equal to or greater than about 16 g/d, a tensile modulus equal to or greater than about 400 g/d, and an energy-to-break equal to or greater than about 20 J/g. Particularly preferred fibers are those having a tenacity equal to or greater than about 20 g/d, a tensile modulus greater than or equal to about 500 g/d, and an energy-to-break equal to or greater than about 20 J/g. Amongst these particularly preferred embodiments, most preferred are those embodiments in which the tenacity of the fibers is equal to or greater than about 22 g/d, the tensile modulus is equal to or greater than about 900 g/d, and the energy-to-break is equal to or greater than about 27 J/g. In the practice of this invention, fibers of choice have a tenacity equal to or greater than about 28 g/d, the tensile modulus is equal to or greater than about 1200 g/d and the energy-to-break is equal to or greater than about 40 J/g.

Useful high strength fibers include extended chain polyolefin fibers, particularly extended chain polyethylene (ECPE) fibers, aramid fibers, polyvinyl alcohol fibers, polyacrylonitrile, liquid crystal copolyester fibers and polyamide fibers.

U.S. Pat. No. 4,457,985 generally discusses such extended chain polyethylene and polypropylene fibers, and the disclosure of this patent is hereby incorporated by reference to the extent that it is not inconsistent herewith. In the case of polyethylene, suitable fibers are those of weight average molecular weight of at least 150,000, preferably at least one million and more preferably between two million and five million. Such extended chain polyethylene fibers may be grown in solution as described in U.S. Pat. No. 4,137,394 to Meihuzen et al., or U.S. Pat. No. 4,356,138 of Kavesh et al., issued Oct. 26, 1982, or a filament spun from a solution to form a gel structure, as described in German Off. No. 3,004,699 and GB No. 2051667, and especially as described in U.S. Pat. No. 4,413,110. As used herein, the term of polyethylene shall mean a predominantly linear polyethylene material that may contain minor amounts of chain branching or comonomers not exceeding 5 modifying units per 100 main chain carbon atoms, and that may also contain admixed therewith not more than about 50 wt % of one or more polymeric additives such as alkene-1-polymers, in particular low density polyethylene, polypropylene or polybutylene, copolymers containing mono-olefins as primary monomers, oxidized polyolefins, graft polyolefin copolymers and polyoxymethylenes, or low molecular weight additives such as anti-oxidants, lubricants, ultraviolet screening agents, colorants and the like which are commonly incorporated by reference. Depending upon the formation technique, the draw ratio and temperatures, and other conditions, a variety of properties can be imparted to these filaments. The tenacity of the filaments should be at least 15 grams/denier, preferably at least 20 grams/denier, more preferably at least 25 grams/denier and most preferably at least 30 grams/denier. Similarly, the tensile modulus of the filaments, as measured by an Instron tensile testing machine, is at least 300 grams/denier, preferably at least 500 grams/denier and more preferably at least 1,000 grams/denier and most preferably at least 1,200 grams/denier. These highest values for tensile modulus and tenacity are generally obtainable only by employing solution grown or gel filament processes. Many of the filaments have melting points higher than the melting point of the polymer from which they were formed. Thus, for example, high molecular weight polyethylene of 150,000, one million and two million generally have melting points in the bulk of 138° C. The highly oriented polyethylene filaments made of these materials have melting points of from about 7° to about 13° C. higher. Thus, a slight increase in melting point reflects the crystalline perfection and higher crystalline orientation of the filaments as compared to the bulk polymer.

Similarly, highly oriented extended chain polypropylene fibers of weight average molecular weight at least 200,000, preferably at least one million and more preferably at least two million may be used. Such extended chain polypropylene may be formed into reasonably well oriented filaments by the techniques prescribed in the various references referred to above, and especially by the technique of U.S. Pat. No. 4,413,110. Since polypropylene is a much less crystalline material than polyethylene and contains pendant methyl groups, tenacity values achievable with polypropylene are generally substantially lower than the corresponding values for polyethylene. Accordingly, a suitable tenacity is at least 8 grams/denier, with a preferred tenacity being at least 11 grams/denier. The tensile modulus for polypropylene is at least 160 grams/denier, preferably at least 200 grams/denier. The melting point of the polypropylene is generally raised several degrees by the orientation process, such that the polypropylene filament preferably has a main melting point of at least 168° C., more preferably at least 170° C. The particularly preferred ranges for the above-described parameters can advantageously provide improved performance in the final article. Employing fibers having a weight average molecular weight of at least about 200,000 coupled with the preferred ranges for the above-described parameters (modulus and tenacity) can provide advantageously improved performance in the final article.

High molecular weight polyvinyl alcohol (PV-OH) fibers having high tensile modulus are described in U.S. Pat. No. 4,440,711 to Y. Kwon, et al., which is hereby incorporated by reference to the extent it is not inconsistent herewith. High molecular weight PV-OH fibers should have a weight average molecular weight of at least about 200,000. Particularly useful PV-OH fibers should have a modulus of at least about 300 g/denier, a tenacity of at least about 7 g/denier (preferably at least about 10 g/denier, more preferably at about 14 g/denier and most preferably at least about 17 g/denier), and an energy to break of at least about 8 joules/g. PV-OH fibers having a weight average molecular weight of at least about 200,000, a tenacity of at least about 10 g/denier, a modulus of at least about 300 g/denier, and an energy to break of about 8 joules/g are more useful in producing a ballistic resistant article. PV-OH fiber having such properties can be produced, for example, by the process disclosed in U.S. Pat. No. 4,599,267.

In the case of polyacrylonitrile (PAN), the PAN fiber should have a weight average molecular weight of at least about 400,000. Particularly useful PAN fiber should have a tenacity of at least about 10 g/denier and an energy to break of at least about 8 joule/g. PAN fiber having a molecular weight of at least about 400,000, a tenacity of at least about 15 to 20 g/denier and an energy to break of at least about 8 joule/g is most useful; and such fibers are disclosed, for example, in U.S. Pat. No. 4,535,027.

In the case of aramid fibers, suitable aramid fibers formed principally from aromatic polyamide are described in U.S. Pat. No. 3,671,542, which is hereby incorporated by reference. Preferred aramid fibers will have a tenacity of at least about 20 g/d, a tensile modulus of at least about 400 g/d and an energy-to-break at least about 8 joules/gram, and particularly preferred aramid fibers will have a tenacity of at least about 20 g/d, and an energy-to-break of at least about 20 joules/gram. Most preferred aramid fibers will have a tenacity of at least about 20 g/denier, a modulus of at least about 900 g/denier and an energy-to-break of at least about 30 joules/gram. For example, poly(phenylenediamine terephalamide) filaments produced commercially by Dupont Corporation under the trade name of Kevlar® 29 and 49 and having moderately high moduli and tenacity values are particularly useful in forming ballistic resistant composites. (Kevlar® 29 has 500 g/denier and 22 g/denier and Kevlar® 49 has 1000 g/denier and 22 g/denier as values of modulus and tenacity, respectively). Also useful in the practice of this invention is poly(metaphenylene isophthalamide) filaments produced commercially by Dupont under the trade name Nomex®.

In the case of liquid crystal copolyesters, suitable fibers are disclosed, for example, in U.S. Pat. Nos. 3,975,487; 4,118,372 and 4,161,470.

The high strength fiber network is impregnated with or embedded in at least one type of matrix material to form a fiber network layer. The matrix material should be a polymeric material, preferably an elastomeric material. A wide variety of elastomeric materials and formulations may be utilized. Representative examples of suitable elastomers have their structures, properties, and formulations, together with cross-linking procedures summarized in the Encyclopedia of Polymer Science, Vol. 5, "Elastomers-Synthetic" (John Wiley & Sons, Inc., 1964). Any of the following materials may be employed: polybutadiene, polyisoprene, natural rubber, ethylenepropylene copolymers, ethylenepropylenediene terpolymers, polysulfide polymers, polyurethane elastomers, chlorosulfonated polyethylene, polychloroprene, plasticized polyvinylchloride using dioctyl phthalate or other plasticizers well known in the art, butadiene acrylonitrile elastomers, poly(isobutylene-coisoprene), polyacrylates, polyesters, polyethers, fluoroelastomers silicone elastomers, thermoplastic elastomers and copolymers of ethylene.

Other suitable matrix materials include polyethylenes, cross-linked polyethylenes, polypropylenes, ethylene copolymers, propylene copolymers and other olefin polymers and copolymers. Additional matrix materials include unsaturated polyesters, phenolics, polybutyrals, epoxy resins and polyurethane resins.

A useful matrix material is a very low modulus, elastomeric material as described in commonly assigned U.S. Ser. No. 42,175, filed Apr. 2, 1993. Such a material has a tensile modulus of less than about 100 psi (690 kPa), preferably less than about 50 psi (345 kPa), most preferably about 35 psi (241 kPa) or less, a tenacity of less than about 450 psi (3105 kPa), preferably less than 400 psi (2760 kPa), most preferably less than 350 psi (2415 kPa), a $T_g$ (as evidenced by a sudden drop in the ductility and elasticity of the material) of about $-10°$ C. to about $-20°$ C., preferably about $-15°$ C., and an elongation-to-break of at least about 2000%, preferably about 2150%, and most preferably about 2300%. A particularly preferred very low modulus elastomeric material is acrylic ester copolymer, especially a group of anionic emulsions of acrylic ester copolymers in water available from B.F. Goodrich under the trade name Hycar®.

Another useful matrix material are block copolymers of conjugated dienes and vinyl aromatic monomers. Butadiene and isoprene are preferred conjugated diene elastomers. Styrene, vinyl toluene and t-butyl styrene are preferred conjugated aromatic monomers. The copolymers may be simple tri-block copolymers of the type A-B-A, multiblock copolymers of the type $(AB)_n$ (n=2–10) or radial configuration copolymers; wherein A is a block from a polyvinyl aromatic monomer and B is a block from a conjugated diene elastomer. Many of these copolymers are produced commercially by the Shell Chemical Co. under the trade name Kraton® and are described in its bulletin "Kraton Thermoplastic Rubber", SC-68-81.

The matrix materials may be compounded with fillers such as carbon black, silica, glass microballoons, etc. up to an amount not to exceed about 300% by weight of the matrix material, preferably not to exceed 100% by weight. The matrix materials may be extended with oils and vulcanized by sulfur, peroxide, metal oxide or radiation cure systems using methods well known to rubber technologists of ordinary skill. Blends of different elastomeric materials may be used together or one or more elastomeric materials may be blended with one or more thermoplastics. High density, low density and linear low density polyethylene may be cross-linked to obtain a material of appropriate properties, either alone or as blends.

A simple composite can be formed from the matrix-impregnated high strength fiber networks. "Simple composite" is intended to denote an article that includes at least one fiber network layer combined with a single major matrix material to form a unitary layer, whether or not there are other materials present such as fillers, lubricants or the like. Simple composite materials may be constructed and arranged in a variety of forms.

The matrix-impregnated fiber network also can be used to form more complex composites. For example, the composite can include a first matrix material and a second matrix material. In a preferred embodiment the second matrix material is in the form of a film which is adjacent to at least one side of an impregnated fiber network. The impregnated fiber network can be pressed or embedded into the second matrix material so that the second matrix material at least partially encompasses the impregnated fibers.

Among second matrix material films which can be used in the invention are thermoplastic polyolefins, thermoplastic elastomers, crosslinked thermoplastics, crosslinked elastomers (e.g., ethylene propylene diene and butyl rubber), polyester, polyamide, fluorocarbon, urethane, epoxy, polyvinylidene chloride, and polyvinyl chloride. Homopolymers or copolymers of these films preferably are uniaxially or biaxially oriented.

It is especially preferred that the film be made of high density polyethylene (preferably having a melting point of about 105®C), polypropylene, or a blend of polyethylene and Kraton®(available from Raven Industries). Such a film acts as an oxygen barrier, provides surface modification and allows for the separation of individual layers after they have been manufactured prior to molding of the final article.

In the preferred case of high density polyethylene film, a film thickness of about 4 to 80 μm, preferably 15 to 25 μm, is used and a pressure of about 0.001 to 1.5 kg/mm², and a temperature, preferably of about 60° to 400° C., more preferably 100° to 160° C., are employed for pressing the impregnated fiber network into the film.

It is convenient to characterize the geometries of such composites by the geometries of the fibers. One such suitable arrangement is a plurality of layers in which the fibers are aligned parallel to one another along a common fiber direction (referred to herein as a "unidirectionally aligned fiber network"). Successive layers of such unidirectional fibers can be rotated with respect to the previous layer. Preferably, the fiber network layers of the composite are cross-plied, that is, with the undirectional fibers of each network layer rotated with respect to the unidirectional fibers of the adjacent layers. Such rotated unidirectional alignments are described, for example, in U.S. Pat. Nos. 4,457,985; 4,748,064; 4,916,000; 4,403,012; 4,623,573; and 4,737,402.

The composite of the invention contains at least one element that has at least two adjacent (i.e., stacked) fiber network layers. In theory, there is no limit on the number of fiber network layers in an element, but it is preferred that there are no more than four layers in a single element. According to the most preferred embodiment, each element includes two cross-plied fiber network layers that are oriented with respect to each other so that the unidirectional fiber direction of one layer is rotated at an angle of 90° relative to the unidirectional fiber direction of the other layer. This preferred element will also be referred to herein as a "0°/90° layup".

It will be recognized that each fiber network layer, and consequently the element, has a sheet-like shape in the sense that it has two plane profiles whose area dimensions are much greater than those of the sides. The dimensions of the plane profiles are measured in terms of width and length while the dimension of the sides is measured in thickness.

The composite of the invention includes at least one element which has a textured pattern on the surface of at least one of its planar profiles. By "textured" it is meant that the surface has raised and depressed areas that (1) are capable of being felt by a human hand and/or (2) form contours that are discernible by a human eye without magnification. By "pattern" it is meant that the raised and depressed areas are distributed in a non-random design or configuration. By "non-random" it is meant that the raised and depressed areas are distributed in a predetermined, uniform manner. Preferably, the surfaces of both plane profiles are textured.

Particularly useful patterns are those typically employed for embossing paper and metal sheets. Illustrative of such patterns are linen, plain weave, fine dot, morocco, cracked ice, woodgrain II, hexpin, taffeta, diamond, pony skin, geometric crosses, pique, small checkers, diamond circle, crystal, cobblestone, leaf, Spanish crush, #20 box, #36 kid, #46 canberra and similar patterns. It is clear from this list of various pattern designs that the individual raised and depressed areas can themselves have a wide variety of shapes such as linear, circular or rectangular. For example, a linear raise or depression could follow an essentially straight path or it could follow a curved path ranging from wave shape to a tight swirl. In another example, the raise or depression could be in the shape of a circular dot. Of course, a single pattern can include a mixture of different types of shapes. Particularly preferred patterns are linen and morocco. In the case of morocco, #43 flat morocco is particularly preferred.

The depth of the depressed areas is not critical, however, it should not be so great as to cause such an extensive degree of delamination and/or fiber breakage that the ballistic performance of the article is adversely effected. Moreover, the depth of the depressed areas is not so great so as to form areas where the amount of matrix material is less than the amount of matrix material in adjacent areas. In other words, the matrix material is distributed substantially uniformly over the fiber network layer so that the matrix material/fiber weight ratio is substantially uniform over the fiber network layer. In addition, as the depth increases the thickness of each fiber network layer increases. It is advantageous to avoid a large increase in layer thickness because such an increase would make the article or composite bulkier thereby decreasing its wearability.

Typically, the thickness of a single textured 2-layer element should not exceed about 0.0092, preferably about 0.0085, in. The thickness of a stack of 30 textured 2-layer elements should not exceed about 0.275, preferably about 0.279, in. The thickness of a stack of 40 textured 2-layer elements should not exceed about 0.380, preferably about 0.370, in. Put another way, a stack of 40 textured 2-layer elements should have a thickness which is no more than a 20%, preferably no more than a 15%, increase over the thickness a stack of 40 non-textured 2-layer elements made from the same fiber and matrix materials.

The textured pattern also should have a high repeat factor. That is, the individual raised and depressed areas should be spaced relatively close together.

Articles such as body armor, bomb blankets and airbags can include the composites of the invention. Typically, the textured elements are stacked together to form a packet and there is a means for securing the individual elements in place. Preferably, each stacked element is unattached to the adjacent elements and the stack is held together by a cover material which has been fastened together in the appropriate positions. Means for fastening the cover material are well-known such as stitches, staples, adhesives and other means known in the art as described, for example, in U.S. Pat. No. 5,185,195. Typical stitches could be tack stitches, lock stitches, chain stitches or zig-zag stitches. The cover material can be any fabric, film or similar material which has sufficient strength to hold the elements in place and has sufficient flexibility.

The composite of the invention can also be used in conjunction with layers of non-textured composites and/or fabrics to form an article. For example, an article could include a stack of textured elements and layers of a woven fabric attached to the stack. Another possibility is a multi-layer stack which includes textured and non-textured elements.

The composite for texturing according to the present invention can be produced by a variety of methods. In general, the matrix material is applied to the high strength fiber network and then the matrix material/fiber network combination is consolidated. By "consolidated" is meant that the matrix material and the fiber network are combined into a single unitary layer. Depending upon the type of matrix material and how it is applied to high strength fibers, consolidation can occur via drying, cooling, pressure or a combination thereof.

For example, the fiber or yarn can be transported through a solution of the matrix material to substantially coat the fiber or yarn and then dried to form a coated fiber or yarn. The resulting coated fiber or yarn can then be arranged into the desired network configuration to form a layer of ballistic resistant material. Alternatively, the fiber network can be constructed initially and then coated with the matrix material or embedded into a film of the matrix material.

The fiber networks can be constructed via a variety of well known methods. In the preferred case of unidirectionally aligned fiber networks, yarn bundles of high strength filaments, preferably having about 30 to about 2000 individual filaments of less than about 12 denier, and more preferably of about 100 individual filaments of less than about 7 denier, are supplied from a creel and led through guides and a spreader bar into a collimating bar prior to coating or impregnating with the matrix material. The collimating comb aligns the filaments coplanarly and in a substantially unidirectional fashion.

The fiber network layers typically contain from about 6 to 12 fiber neds per inch (2.4 to 4.7 ends per cm) and preferably 8 to 11 ends per inch (3.2 to 4.3 ends per cm). Prior to texturing, each layer (including matrix material) is typically from about 0.01 to 0.2, preferably about 0.04 to 0.12, and most preferably about 0.06 to 0.10, mil (mm) thick.

In the instances of a simple composite where the resin matrix material is supplied in the form of a film, U.S. Pat. No. 5,173,138, hereby incorporated by reference, describes a method for making the matrix material-impregnated fibrous network used in the present invention. This method includes feeding a matrix film onto at least one side of the fiber network while heating for a time sufficient to impregnate the fiber network with the film without damaging the fibers and physical properties of the resin matrix.

Alternatively, the fiber network layer can be sandwiched between release papers, one of which is coated with the wet matrix material. This system is then passed under a series of pressure rolls to complete the impregnation of the fibers. The top release paper is pulled off while the impregnated network of fibers is subjected to heat to remove the solvent from the matrix material.

A preferred method for making the pretextured fiber network layer employs a separate film of a second matrix material upon which the high strength fiber or yarn is disposed and then coated. More specifically, the high strength fibers are transported through a comb means which collimates the fibers to form a unidirectionally aligned fiber network. The unidirectional fibers are laid onto a moving film of the second matrix material. A solution of a first matrix material, for example, Kraton® or Hycar®, then is coated onto the fibers which are laying on the film, thereby adhering the fibers to the film. The first matrix material may penetrate between the fibers and the film and should occupy substantially all the void space between the fibers, although some void spaces may remain. The first matrix material is subsequently dried. The coating and drying steps can be repeated to achieve the desired amounts of matrix material relative to the amount of fiber. An apparatus for carrying out this method is described in U.S. Pat. No. 5,149,391, hereby incorporated by reference.

Once the individual matrix material-impregnated fiber network layers have been consolidated, the pre-textured element is fabricated by molding together at least two fiber network layers. By "molding" is meant the step of adhering together the individual fiber network layers. In the most preferred embodiment, two matrix material-impregnated fiber network layers are continuously cross-plied, preferably by cutting one of the networks into lengths that can be placed successively across the width of the other network in a 0°/90° orientation. The resulting continuous ply can then be wound into a roll for molding as described in PCT Publication No. WO 91/12136, incorporated herein by reference. The cross-plied matrix material-impregnated fiber network layers that are wound into the roll can also include a second matrix material that is preferably in the form of a film as described previously.

In addition, as described in PCT Publication No. WO 91/12136, a separation layer of material optionally can be wrapped into the roll with the continuous ply to serve as an interleaf for preventing adjacent elements from adhering to each other. The interleaf material can also be used to supply the necessary pressure for molding the fiber network layers. When the roll is unwound the interleaf material, of course, is removed from the continuous element before the element is subjected to texturing. Illustrative interleaf materials include waxed (e.g., silicone) paper such as Kraft paper, nylon film, polyester film and shrink wrap materials such as polyester, polyethylene, polyvinyl chloride and ethyvinylacetate.

The temperatures and/or pressures to which the fiber network layers are exposed for molding vary depending upon the type of resin matrix material and high strength fiber used as described, for example, in U.S. Pat. Nos. 4,916,000, 5,135,804 and PCT Publication No. WO 91/12136 (all incorporated herein by reference). In the case of ECPE fiber networks, the temperature should not exceed about 260° F. (127° C.).

The proportion of matrix material to fiber in the embossed composite may vary widely, depending upon the end use. If the density of the matrix material is similar to that of the fiber, then the matrix material may generally form from about 10 to about 40% by weight, preferably about 14 to 30%, more preferably 16 to 24%, and most preferably about 18 to 22%, based on the weight of an individual layer or the final composite. For ballistic resistant composite articles, the preferred range is up to 28% by weight. If the densities of the matrix material and fiber are dissimilar, then the matrix material may form from about 5 to about 40% by volume, preferably about 6 to 30%, more preferably 7 to 24%, and most preferably about 8 to 22%, based on the volume of an individual layer or the final composite. In the embodiments which include a second matrix material, then the first matrix material may generally form from about 5 to about 35% by weight, preferably about 10 to 25%, more preferably 11 to 20%, and most preferably about 18 to 22%, and the second matrix material may correspondingly generally form from about 5 to about 30% by weight, preferably about 6 to 14% by weight, more preferably 7 to 14%, and most preferably about 8 to 12%, based on the weight of the layer or the final composite.

After the element has been formed it is textured according to the invention. Any conventional methods typically used for embossing paper and metal sheets should be capable of applying the texturing. Since the composite has such high strength, a matching or male/female embossing system is preferred. In general, a sheet of the element is placed between a pressing surface having a plurality of raised bosses and a backing surface that is the complementary negative of the pressing surface. In other words, the pressing surface and the backing surface are aligned in an opposing male/female relationship so that the raised bosses of the pressing surface conform to the complementary recesses in the backing surface. The raised bosses are in a pattern which is the mirror image of the desired textured pattern. The pressing surface and the backing surface then are simultaneously brought into contact with the surfaces of the respective plane profiles of the element.

The pressing and backing surfaces can be carried on a plate or a roll. The surfaces can be an integral part of the plate or roll or they can be made of a material that is different from that of the plate or roll. For example, the backing surface can be a sheet of hard paper wrapped around a metal roll. Illustrative of pressing and backing surface materials that can be used include metal, hard paper and hard plastic.

A preferred system for continuous texturing is depicted in FIG. 1. A continuous sheet of an element 1 having two fiber network layers is unwound from a stock roll 2, transported over a brake 3, and through a nip 10 between an embossing roll 4 and a backing roll 5. The two fiber network layers are adhered together in the previously described 0°/90° orientation. It is important to recognize that element sheet 1 should be unwound so that the plane profile surface 6 formed by the fiber network layer having the unidirectional fibers in the machine or warp direction is facing the embossing roll 4. In other words, the fiber network layer facing the embossing roll 4 has unidirectional fibers that are aligned substantially parallel to the running direction of the element sheet 1. The fiber network layer forming the plane profile surface 7 facing the backing roll 5 has unidirectional fibers that are aligned substantially perpendicular to the running direction of the element sheet 1 (also known as the fill direction). The fiber direction perpendicular to the running direction of the element sheet 1 will also be referred to herein as the "fill" direction. The element sheet 1 leaving the nip 10 is transported via at least one carrier roll 8 to a wind-up roll 9 onto which the textured product is wound. More than set of embossing and backing rolls may be used, but one set is usually sufficient.

Because of the need to have a fiber network layer wherein the fibers run substantially parallel to the machine direction, it is advantageous that the pretextured element unwound from the stock role 2 is molded in the form a roll as described previously. Such a roll provides the continuous warp fiber network layer that is required.

In the preferred embodiment of FIG. 1, the embossing roll 4 is made of metal, preferably steel, and the backing roll 5 is a metal roll wrapped with a hard paper. The pattern on the embossing roll 4 is the male pattern and the pattern on the backing roll 5 is the complementary female pattern. Although other materials may be used for the backing roll 5, a metal backing roll tends to shear the element and a hard rubber backing roll tends to have insufficient hardness to form the textured pattern. An element that has been textured according to the method depicted in FIG. 1 exhibits a textured pattern on both plane profile surfaces, however, the pattern on the warp side plane profile surface (the surface facing the embossing roll) is more pronounced than the pattern on the other plane surface Either cold or hot roll embossing can be used. If heated embossing, which is preferred, is used, the embossing temperature must be at or below the melting point of the high strength fiber, the melting point of the first matrix material and the melting point of the second matrix material if it is present. Since the melting point of the matrix material is not exceeded, there is no flow of matrix material from one point to another and, thus, the amount of matrix material distributed over the surface based on weight should stay substantially uniform. In the case of the preferred embodiment of ECPE fiber and a polyethylene film as the second matrix material, hot roll embossing occurs at an embossing temperature of from about 160° to about 220° F., preferably from about 180° to about 200° F. The embossing pressure should be from about 750 to about 1900 psi, preferably from about 1500 to about 1800 psi. The element should be transported through the nip 10 at a rate of about 11 to about 25, preferably about 15 to about 20, yd/min.

Alternatively, the texturing can be accomplished by using platens which may be heated to the previously described temperatures and applied at the previously described levels of pressure for embossing rolls.

The following examples are presented to demonstrate the advantages of the invention. The specific techniques, conditions, materials, proportions and reported data set forth to illustrate the principles of the invention are exemplary and should not be construed as limiting the scope of the invention.

The fiber network layers in each example were made by unidirectionally aligning about 8 to 10 yarn ends per inch of a 1300 denier ECPE yarn available from AlliedSignal under the tradename Spectra® 1000 onto a polyethylene film, coating onto the fiber network and film a polystyrene-polyisoprene-polystyrene block copolymer available from Shell Chemical Co. under the tradename Kraton D1107P, and consolidating the impregnated fiber network. A two-ply element was made by continuously cross-plying two of these fiber network layers in a 0°/90° orientation. Each element then was textured with a morocco pattern using the method depicted in FIG. 1 at the embossing speeds and pressures indicated in Table 1. The embossing temperature for all the examples was 200° F., except Example 4 where the embossing temperature was 150° F. The elements used in the comparative example had the same construction except that it was not textured.

The flexibility of an example was measured by cutting 5 inches×1 inch strips from a 0°/90° element. One group of strips was cut from the element so that the direction of the 5 inches length dimension was parallel to the machine or warp direction of the element. Another group of strips was cut from the element so that the direction of 5 inches length dimension was parallel to fill direction of the element. Each strip then was placed over a 1½ inches×⅜ inch slit in the center of a ¼ inch thick metal plate. Using an Instron machine, a 1¼ inch×¼ inch piece of metal moving at a rate of 5 in./min pushes the example strip through the slit. The maximum strength required to push the strip through the slit is recorded. As can be seen from the results listed in Table 1, the textured elements of the invention exhibit significantly greater flexibility than the comparative non-textured examples.

TABLE I

| Example | Speed (yds/min) | Pressure (psi) | Flexibility (lbs./in) | | |
|---|---|---|---|---|---|
| | | | Warp | Fill | Avg. |
| Comparative | — | — | 84.70 | 82.23 | 83.47 |
| 1 | 11 | 1200 | 42.98 | 61.38 | 52.18 |
| 2 | 11 | 1200 | 44.98 | 62.37 | 53.58 |
| 3 | 11 | 1500 | 43.19 | 60.05 | 51.62 |
| 4 | 11 | 1700 | 45.44 | 55.15 | 50.30 |
| 5 | 11 | 1800 | 35.83 | 60.17 | 48.00 |
| 6 | 18 | 1200 | 45.93 | 54.45 | 50.19 |
| 7 | 18 | 1500 | 39.67 | 54.43 | 47.05 |
| 8 | 18 | 1700 | 61.62 | 61.38 | 61.50 |
| 9 | 18 | 1800 | 37.91 | 53.17 | 45.54 |
| 10 | 18 | 1800 | 41.94 | 57.07 | 49.51 |
| 11 | 25 | 1200 | 50.08 | 60.03 | 55.06 |
| 12 | 25 | 1500 | 43.22 | 56.54 | 49.88 |
| 13 | 25 | 1500 | 42.83 | 52.57 | 47.70 |
| 14 | 25 | 1800 | 49.41 | 63.37 | 56.39 |

It is also surprising that the textured composite of the invention exhibits a satisfactory level of ballistic resistance since the texturizing does appear to cause limited delamination of the fiber network layers and limited fiber kinking, if not fiber breakage. It would have been expected that such damage would have significantly adversely effected the ballistic resistance.

Another advantage conferred by this invention is that the texturing imparts improved energy absorption when impacted by a projectile resulting in reduced deformation of the material backing the composite during conventional ballistic testing. In other words, the composite of the invention deforms to a lesser degree than a non-textured composite.

From the foregoing description, one skilled in the art can easily ascertain the essential characteristics of this invention, and without departing from the spirit and scope thereof, can make various changes and modifications of the invention to adapt it to various usages and conditions.

We claim:

1. A composite comprising an element which includes at least two adjacent fiber network layers, each of the fiber network layers comprising a network of high strength fibers having a tenacity of at least about 7 g/d, a tensile modulus of at least about 100 g/d and an energy-to-break of at least about 8 J/g, in a matrix material, wherein the element has a first plane profile and a second plane profile, at least one of the first and second plane profiles has on its surface a textured pattern, and the matrix material is distributed substantially uniformly based on weight over the textured plane profile.

2. A composite according to claim 1, wherein the high strength fibers are selected from at least one of the group consisting of extended chain polyolefin fibers, aramid fibers, polyvinyl alcohol fibers, polyacrylonitrile fibers, liquid crystal copolyester fibers, and polyamide fibers.

3. A composite according to claim 1, wherein the high strength fibers comprise extended chain polyethylene fibers.

4. A composite according to claim 1, wherein the high strength fibers have a tenacity of at least about 20 g/d, a tensile modulus of at least about 500 g/d and an energy-to-break of at least about 20 J/g.

5. A composite according to claim 1, wherein at least one of the fiber network layers further comprises a second matrix material.

6. A composite according to claim 1, wherein the textured pattern is selected from the group consisting of linen, plain weave, fine dot and morocco.

7. A composite according to claim 6, wherein the textured pattern comprises a linen pattern.

8. A composite according to claim 6, wherein the textured pattern comprises a morocco pattern.

9. A composite according to claim 1, wherein the high strength fibers are unidirectionally aligned and the fiber alignment of each fiber network layer is rotated relative to the fiber alignment of the adjacent fiber network layer.

10. A composite according to claim 9, wherein the fiber alignment of each fiber network layer is rotated at an angle of about 90° relative to the fiber alignment of the adjacent fiber network layer.

11. A composite according to claim 1, wherein the element comprises two fiber network layers each having unidirectionally aligned high strength fibers rotated at an angle of about 90° relative to each other, the first plane profile has a textured pattern on its surface, and the second plane profile has a textured pattern on its surface.

12. A composite according to claim 11, wherein each fiber network layer further comprises a second matrix material.

13. A composite according to claim 12, wherein the second material is in the form of a film.

14. A composite according to claim 11, wherein the first plane profile has a linen pattern on its surface and the second plane profile has a linen pattern on its surface.

15. A composite according to claim 11, wherein the first plane profile has a morocco pattern on its surface and the second plane profile has a morroco pattern on its surface.

16. An article comprising at least one composite element which includes at least two adjacent fiber network layers, each of the fiber network layers comprising a network of high strength fibers having a tenacity of at least about 7 g/d, a tensile modulus of at least about 100 g/d and an energy-to-break of at least about 8 J/g, in a matrix material, wherein the composite element has a first plane profile and a second plane profile, at least one of the first and second plane profiles has on its surface a textured pattern, and the matrix material is distributed substantially uniformly based on weight over the textured plane profile.

17. An article comprising a plurality of composite elements and a means for securing said composite elements together, wherein each composite element is unattached to the adjacent composite elements, each of said composite elements including at least two adjacent fiber network layers, each of the fiber network layers comprising a network of high strength fibers having a tenacity of at least about 7 g/d, a tensile modulus of at least about 100 g/d and an energy-to-break of at least about 8 J/g, in a matrix material, wherein each composite element has a first plane profile and a second plane profile, at least one of the first and second plane profiles has on its surface a textured pattern, and the matrix material is distributed substantially uniformly based on weight over the textured plane profile.

18. An article according to claim 17, wherein said securing means comprises a cover material and a means for fastening the cover material together.

19. An article according to claim 16, wherein said article is an insert for a protective garment.

20. An article according to claim 17, wherein the element comprises two fiber network layers each having unidirectionally aligned high strength fibers rotated at an angle of about 90° relative to each other, the first plane profile has a textured pattern on its surface, the second plane profile has a textured pattern on its surface, and the high strength fibers are extended chain polyethylene fibers.

* * * * *